C. J. PATTERSON.
METHOD OF AND APPARATUS FOR MIXING DOUGH.
APPLICATION FILED JAN. 9, 1919.
1,334,395. Patented Mar. 23, 1920.
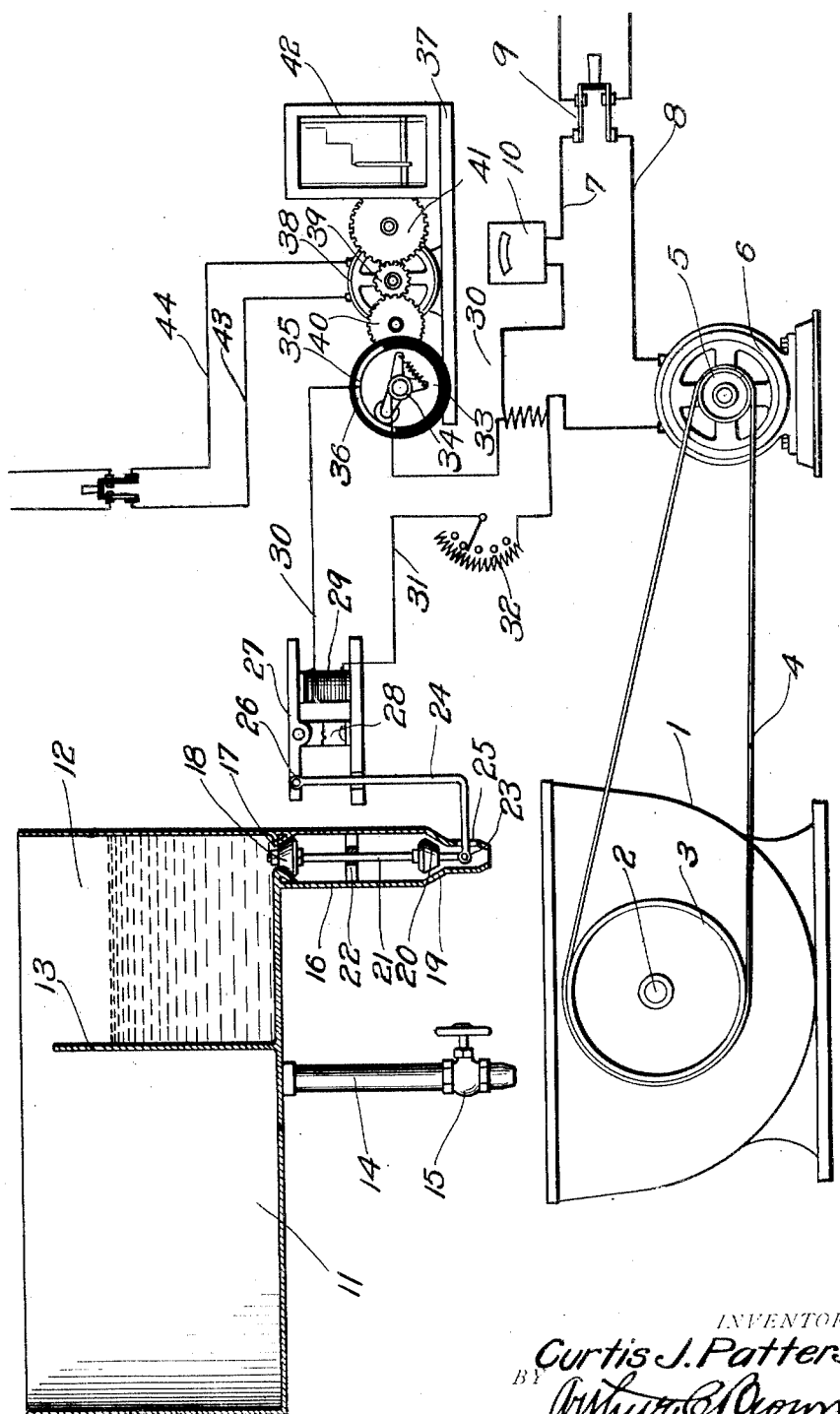
INVENTOR
Curtis J. Patterson,
BY
ATTORNEY.

UNITED STATES PATENT OFFICE.

CURTIS J. PATTERSON, OF KANSAS CITY, KANSAS.

METHOD OF AND APPARATUS FOR MIXING DOUGH.

1,334,395.  Specification of Letters Patent.  Patented Mar. 23, 1920.

Application filed January 9, 1919. Serial No. 270,252.

*To all whom it may concern:*

Be it known that I, CURTIS J. PATTERSON, a citizen of the United States, residing at Kansas City, in the county of Wyandotte and State of Kansas, have invented certain new and useful Improvements in Methods of and Apparatus for Mixing Dough; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to a method of and apparatus for mixing a pulverulent material and a liquid together to form a plastic mass.

The invention relates particularly to the mixing of dough and the primary object thereof is to provide means for insuring the production of a plastic mass of a determined consistency.

Various grades of flour require different amounts of water to produce a dough of a given consistency and it is one of the purposes of this invention to provide for the variation in the requirements of the flour. In the actual practice followed by bakers, certain well-known types of mixing machines are utilized and the power required to operate the machines under any given load is easily deducible.

According to my invention I can insure the proper proportion of liquid combined with the flour by measuring the current consumption of the motor and introducing measured amounts of liquid into the dough mixer in response to the indicated load on the motor.

I have provided mechanical means for accomplishing the desired result so that the feeding of the water may be automatically controlled by the load demand on the motor and in such manner that when the dough has reached a pre-determined consistency, the flow of water will be shut off and the manipulation of the dough batch may continue without any additional moisture.

In the drawings:

The figure represents a diagrammatic view of a system for automatically carrying out the invention.

Referring now to the drawings by numerals of reference:

1 designates a dough mixer of approved construction on the stirrer shaft 2 of which is a pulley 3 driven by a belt 4 from the pulley 5 on the electric motor 6. The electric motor 6 is energized from a line consisting of the conductors 7 and 8 and in the line is the usual switch 9. 10 is an ammeter in series in the line, the purpose of which will be presently explained.

It is well known that flour will absorb from 50% to 70% moisture and I have provided means whereby a considerable proportion of the moisture to be added may be first introduced into the dough mixer whereby the remaining requirement may be introduced in measured quantities. One form of device for introducing the water or other liquid is shown in the drawing as consisting of a reservoir or tank 11 divided from a compartment or secondary tank 12 by a partition 13. A discharge nozzle 14 leads from the bottom of the tank 11 and is provided with an ordinary valve 15 whereby the water from the tank 11 may be introduced into the mixer 1. The tank 12 is also provided with a discharge nozzle or tube 16, the outlet of which is above but adjacent to the mixer 1. The nozzle or measuring chamber 16 has communication with the tank 12 through a port 17 adapted to be closed by a valve 18 and the outlet end 19 of said chamber is provided with a valve seat adapted to be closed by a valve 20, the valves 18 and 20 being upon a vertical stem 21 slidable in guide 22 in chamber 16. The stem 21 extends slightly below the valve 20 and is pivotally connected at 23 to an elbow link 24 vertically movable in a slot 25 in the housing 16 and having its upper end pivotally connected at 26 to the rocking armature 27 constituting part of the motor and supported on the standard 28. The electro-magnet 29 may be energized from a shunt circuit consisting of the conductors 30 and 31 in series with the main line and provided with a rheostat 32 and a shunt coil 32'. In the line for the magnet is a circuit maker and breaker 33 connected to the conductor 30 and consisting of the rotating element 34 and the arcuate contact 35 embedded in the insulation 36, the whole being supported upon the base 37 and driven from the motor 38 through the medium of the gears 39 and 40. The gear 39 of the motor 38 also meshes with the gear 41 connected to a movable part of a recording indicator 42 which may be of any approved construction which will record the operating periods of the system. The motor 38 may be energized by any suitable source through the conductors 43 and 44. Since the motor 38 will be a constantly rotating motor and a comparatively small unit, it may be driven from a separate line of low potential, such a line being generally available around power plants but if necessary, a storage battery may be employed.

Assuming all the parts to be assembled as shown, the flour may be introduced into the mixer 1 and a proportion of the liquid to be added may be allowed to escape from the tank 11. The tank 11 may be so proportioned that it will contain about 50% of the estimated mass and this liquid may first be allowed to escape into the mixer 1; the operator may then close the switch 9 and start the motor 6 which will preferably be a constant speed motor. The rheostat 32 will be set to cause the magnet 29 to be energized to substantiate the saturation point at any pre-determined load; as the motor continues to operate, current from the line consisting of the conductors 7 and 8 will be ready to energize the magnet 29. Each time the contacts 34 and 35 come together, however, the coil 29 will not be energized sufficiently to attract the magnet 27 except under the predetermined load or, in other words, when a determined current demand is called for by the motor 6. When this occurs the coil 29 will be energized sufficiently to attract the armature 27 causing the valve 20 to be unseated and the valve 18 to be seated. This will be effective in permitting the escape of the contents of the liquid in the casing 16 in a measured quantity. The duration of time on which the contacts 34 and 35 are together will be long enough to permit the chamber 16 to become emptied, then the contact 34 will move on to the insulating material, the coil 29 will become deënergized permitting the valve 20 to be seated and the valve 18 to be unseated so that the chamber 16 will fill up with liquid. As the contact 34 again rolls over the contact 35, the coil 29 will again become energized and unseat the valve 20 and seat the valve 18 admitting additional liquid. The liquid will continue to be introduced into the mixer in measured quantities until the consistency of the dough is thin enough to reduce the current demand on the line for the motor 6, then the coil 29 will cease to attract the magnet 27; this will permit the valve 20 to remain seated with a measured quantity of liquid in the chamber 16 until the load on the motor increases sufficiently to require additional moisture in the mixer 1, whereupon the operation just described will be repeated.

The recording indicator 42 will indicate and record the period of time that the unit is operating. The ammeter 10 in the main line will be effective in indicating the current value or the amperage flowing through the main line circuit at any given time whereby a direct reading may be had.

Having thus described my invention, what I claim as new therein, and desire to secure by Letters-Patent is:

1. In combination with a mixer for pulverulent material and a liquid and an electric motor therefor; a liquid delivery device having a measuring valved chamber discharging into the mixer, and valve operating means controllable by changes in current demand by the motor.

2. In combination with a mixer for pulverulent material and a liquid and an electric motor therefor; of a liquid measuring device for discharging liquid into the mixer in measured quantities, a motor for operating the measuring device, a motor circuit, and a constantly operating circuit maker and breaker in the motor circuit.

3. In a mechanism for mixing pulverulent material and a liquid, an electric motor driven mixer, a discharging device emptying into the mixer, and means for releasing the contents of the discharging device, said means being dependent for its operation upon the load demand of the motor.

4. In a mechanism for mixing materials having different physical characteristics, an electric motor driven mixer, discharging devices emptying into the mixer, and means for releasing the contents of the discharging devices, said means being dependent for its operation upon the load demand of the motor.

In testimony whereof I affix my signature.

CURTIS J. PATTERSON.